Patented Apr. 27, 1926.

1,582,423

UNITED STATES PATENT OFFICE.

MASATOSI OKOCHI AND MOTOKITI HANAOKA, OF TOKYO, JAPAN, ASSIGNORS TO ZAIDAN HOJIN RIKAGAKU KENKYUJO, OF TOKYO, JAPAN.

PROCESS OF ELECTRODEPOSITING IRON FROM IRON-CONTAINING MINERALS.

No Drawing.   Application filed April 2, 1924. Serial No. 703,819.

*To all whom it may concern:*

Be it known that MASATOSI OKOCHI and MOTOKITI HANAOKA, subjects of the Emperor of Japan, residing at No. 1 Shimizu-cho, Yanaka, Shitaya-ku, Tokyo, Japan, and No. 37 Horai-cho, Komagome, Hongo-ku, Tokyo, Japan, have invented certain new and useful Improvements in Processes of Electrodepositing Iron from Iron-Containing Minerals, of which the following is a specification.

This invention relates to producing iron from granular or pulverulent ores like magnetic sand, yellow ochre, bog iron ore, and the like, in which there is also used a certain amount of a sulfid, e. g., pyrites, pyrrhotite.

The magnetic sand, yellow ochre, bog iron ore (or a concentrate thereof) is first reduced as completely as possible in an externally heated muffle or equivalent device, under conditions to form reduced granular or spongy iron. This can be conveniently performed by placing such ore, mixed with fine carbonaceous material (charcoal, coal or coke) or other solid reducing agent, in a muffle and heating to say, 900° C., and passing a reducing gas such as $CH_4$, CO, producer gas, hydrogen, coal gas or the like, through the muffle. The temperature can easily be kept below 1000° C., and the ore largely or almost completely reduced in 10 minutes at 900° C., or 1½ hours at 600° C. The waste gases from the above can be used as fuel, e. g., for heating the muffle. This forms unsintered or at least unmelted spongy iron, which is of course cooled without access of air, which would cause oxidation.

This sponge is preferably then subjected to a further magnetic separation (or other concentration method, e. g., flotation) to remove silicates, titanium compounds and perhaps unreduced ore. This step is optional but it is very advisable as it greatly reduces the amount of anode slime formed in the subsequent electrolysis.

The sponge is then well mixed with a sulfid, e. g., pyrites, in about equal amounts. The mixture is then subjected to electrolysis in an acid bath, preferably while warm. The bath may contain $H_2SO_4$, HCl or other mineral acid, and if the electrolysis is to be conducted at 60° C., a current of 1.5 volts at 4 amperes per square decimeter of cathode surface is used. If the electrolysis is at 90° C. use the same voltage and 8 amperes.

The anode may be iron or lead, around which is placed the mixture of reduced granular or spongy iron and sulfid, in a foraminous basket of bamboo, reticulated tin, lead or other insoluble metal, surrounded by a canvas bag.

The anode surface should be several times larger than the cathode surface, the latter being preferably of brass, and upon which iron will be deposited by the electrolysis.

We claim:—

A process of treating magnetic iron sands, yellow ochre, bog iron ore and the like, which are granular and easily crushable, which comprises reducing such ore at a temperature below 1000° C., incorporating the reduced iron with an iron sulfid material, and subjecting the mixture to electrolysis in an acid aqueous bath, the said mixture of spongy iron and sulfid forming the anode.

In testimony whereof we affix our signatures.

MASATOSI OKOCHI.
MOTOKITI HANAOKA